(12) United States Patent
Meyer et al.

(10) Patent No.: US 11,063,850 B2
(45) Date of Patent: Jul. 13, 2021

(54) SLAVE-TO-MASTER DATA AND OUT-OF-SEQUENCE ACKNOWLEDGEMENTS ON A DAISY-CHAINED BUS

(71) Applicant: ATI TECHNOLOGIES ULC, Markham (CA)

(72) Inventors: Eric D. Meyer, Markham (CA); Nima Osqueizadeh, Markham (CA)

(73) Assignee: ATI TECHNOLOGIES ULS, Markham (CA)

(*) Notice: Subject to any disclaimer, the term of this patent is extended or adjusted under 35 U.S.C. 154(b) by 2 days.

(21) Appl. No.: 16/116,576

(22) Filed: Aug. 29, 2018

(65) Prior Publication Data
US 2020/0076713 A1 Mar. 5, 2020

(51) Int. Cl.
| | |
|---|---|
| *H04W 4/00* | (2018.01) |
| *H04L 12/26* | (2006.01) |
| *H04L 29/06* | (2006.01) |
| *H04L 1/16* | (2006.01) |
| *H04L 1/18* | (2006.01) |
| *H04L 12/40* | (2006.01) |

(52) U.S. Cl.
CPC ............ *H04L 43/06* (2013.01); *H04L 1/1607* (2013.01); *H04L 1/1835* (2013.01); *H04L 69/18* (2013.01); *H04L 69/22* (2013.01); *H04L 12/40* (2013.01)

(58) Field of Classification Search
CPC ..... H04L 43/06; H04L 1/1607; H04L 1/1835; H04L 69/18; H04L 69/22
See application file for complete search history.

(56) References Cited

U.S. PATENT DOCUMENTS

| | | | | |
|---|---|---|---|---|
| 5,812,796 | A * | 9/1998 | Broedner | G06F 13/4291 710/260 |
| 8,948,179 | B2 * | 2/2015 | Zhao | H04L 45/42 370/392 |
| 10,156,836 | B2 * | 12/2018 | Ryu | G06F 13/24 |
| 2004/0193772 | A1 * | 9/2004 | Augsburg | G06F 13/4204 710/307 |
| 2006/0031618 | A1 * | 2/2006 | Hansquine | G06F 13/4295 710/305 |
| 2009/0210596 | A1 * | 8/2009 | Furuya | G06F 13/4247 710/110 |
| 2011/0093739 | A1 * | 4/2011 | Bernon-Enjalbert | ........................ H04L 25/028 714/4.5 |

(Continued)

OTHER PUBLICATIONS

Implementing Serial Bus Interfaces with General Purpose Digital Instrumentation by Dale Johnson (Year: 2009).*

(Continued)

*Primary Examiner* — Maharishi V Khirodhar

(57) ABSTRACT

A reporting device communicates with a master device by a first component and a daisy-chained second component. The reporting device receives a signal from the master device via the first component. The signal triggers the reporting device to transmit synchronously a telemetry data packet on the daisy-chained second component when a downstream device is coupled to the second component. The reporting device receives a first header packet having an address of the reporting device, transmits the telemetry data packet to the downstream device, and transmits a second header packet having an address of the downstream device.

22 Claims, 10 Drawing Sheets

(56) References Cited

U.S. PATENT DOCUMENTS

| | | | |
|---|---|---|---|
| 2011/0285516 A1* | 11/2011 | Ritter | H04W 88/04 |
| | | | 340/286.02 |
| 2012/0303836 A1* | 11/2012 | Ngo | G06F 13/4247 |
| | | | 710/10 |
| 2013/0108898 A1* | 5/2013 | Potts | H02J 7/0016 |
| | | | 429/50 |
| 2013/0124763 A1 | 5/2013 | Kessler | |
| 2015/0104673 A1 | 4/2015 | De Greef et al. | |
| 2016/0031618 A1* | 2/2016 | Abfall | B65D 51/16 |
| | | | 222/131 |
| 2017/0046292 A1* | 2/2017 | Teuke | H04L 12/40169 |

OTHER PUBLICATIONS

MBus: A Fully Synthesizable Low-power Portable Interconnect Bus for Millimeter-scale Sensor Systems, Inhee Lee1, Ye-Sheng Kuo1, Pat Pannuto1, Gyouho Kim1, Zhiyoong Foo1, Ben Kempke1, Seokhyeon Jeong1, Yejoong Kim1, Prabal Dutta1, David Blaauw1, and Yoonmyung Lee2 (Year: 2016).*

"PMBus Power System Management Protocol Specification: Part 1—General Requirements, Transport and Electrical Interface", System Management Interface Forum, Mar. 13, 2015, 27 pages.

"PMBus Power System Management Protocol Specification: Part 2—Command Language", System Management Interface Forum, Mar. 13, 2015, 121 pages.

"PMBus Power System Management Protocol Specification: Part 3—AVSBus", System Management Interface Forum, Mar. 13, 2015, 34 pages.

\* cited by examiner

| | | MASTER 801 | SLAVE 1 802 | SLAVE 2 803 | SLAVE 3 804 | SLAVE 4 805 |
|---|---|---|---|---|---|---|
| PRE-CLOCK 0 811 | SVTI REG: SVTO REG: SVTO  SVTI | IDLE (1b) 852— —851 1 | IDLE (1b) IDLE (1b) 1 | IDLE (1b) IDLE (1b) 1 | IDLE (1b) IDLE (1b) 1 | 831— IDLE (1b) —832 1 |
| CLOCK 0 812 | SVTI REG: SVTO REG: SVTO  SVTI | IDLE (1b) 1 | IDLE (1b) IDLE (1b) 1 | IDLE (1b) IDLE (1b) 1 | IDLE (1b) IDLE (1b) 1 | 833 START PACKET[1] 0 |
| CLOCK 2 813 | SVTI REG: SVTO REG: SVTO  SVTI | IDLE (1b) 1 | IDLE (1b) IDLE (1b) 1 | IDLE (1b) IDLE (1b) 1 | IDLE (1b) IDLE (1b) 1 | 834 SLAVE 4 HEADER[7] 1 |
| CLOCK 6 814 | SVTI REG: SVTO REG: SVTO  SVTI | IDLE (1b) 1 | START PACKET[0] START PACKET[1] 0 | IDLE (1b) IDLE (1b) 1 | START PACKET[0] START PACKET[1] 0 | 835 SLAVE 4 HEADER[3] 1 |
| CLOCK 10 815 | SVTI REG: SVTO REG: SVTO  SVTI | SLAVE 4 HEADER[6] —855 1 | SLAVE 4 HEADER[4] SLAVE 4 HEADER[5] 0 | SLAVE 4 HEADER[6] SLAVE 4 HEADER[7] 1 | SLAVE 4 HEADER[4] SLAVE 4 HEADER[5] 0 | 836 SLAVE 4 1ST TEL[15] X |
| CLOCK 26 816 | SVTI REG: SVTO REG: SVTO  SVTI | SLAVE 4 1ST TEL[6] 1 | SLAVE 4 1ST TEL[4] SLAVE 4 1ST TEL[5] X | SLAVE 4 1ST TEL[2] SLAVE 4 1ST TEL[3] X | SLAVE 4 1ST TEL[0] SLAVE 4 1ST TEL[1] 1 | 837 X |
| CLOCK 42 817 | SVTI REG: SVTO REG: SVTO  SVTI | SLAVE 4 2ND TEL[6] X | SLAVE 4 2ND TEL[4] SLAVE 4 2ND TEL[5] X | SLAVE 4 2ND TEL[2] SLAVE 4 2ND TEL[3] X | SLAVE 4 2ND TEL[0] SLAVE 4 2ND TEL[1] 1 | 838 SLAVE 4 2ND TEL[15] X |
| CLOCK 50 818 | SVTI REG: SVTO REG: SVTO:SVTI | SLAVE 3 HEADER[6] 1 | SLAVE 3 HEADER[4] SLAVE 3 HEADER[5] 0 | SLAVE 3 HEADER[2] SLAVE 3 HEADER[3] 0 | SLAVE 3 HEADER[0] SLAVE 3 HEADER[1] 1 | 839 IDLE (1b) 1 |

| | MASTER 801 | FIRST SLAVE 802 | SECOND SLAVE 803 | THIRD SLAVE 804 | FOURTH SLAVE 805 |
|---|---|---|---|---|---|
| CLOCK 84 <br> 819 <br> SVTI REG: <br> SVTO REG: <br> SVTO SVTI | SLAVE 3 2ND TEL[4] <br> X | SLAVE 3 2ND TEL[2] <br> SLAVE 3 2ND TEL[3] <br> X X | SLAVE 3 2ND TEL[0] <br> SLAVE 3 2ND TEL[1] <br> X X | IDLE (1b) <br> SLAVE 2 HEADER[7] <br> 1 | IDLE (1b) <br> 1 |
| CLOCK 126 <br> 820 <br> SVTI REG: <br> SVTO REG: <br> SVTO SVTI | SLAVE 2 2ND TEL[2] <br> X | SLAVE 2 2ND TEL[0] <br> SLAVE 2 2ND TEL[1] <br> X X | IDLE (1b) <br> SLAVE 1 HEADER[7] <br> X 1 | IDLE (1b) <br> IDLE (1b) <br> 1 1 | IDLE (1b) <br> 1 |
| CLOCK 152 <br> 821 <br> SVTI REG: <br> SVTO REG: <br> SVTO SVTI | SLAVE 1 1ST TEL[0] <br> X | IDLE (1b) <br> SLAVE 1 2ND TEL[15] <br> X 1 | IDLE (1b) <br> IDLE (1b) <br> 1 1 | IDLE (1b) <br> IDLE (1b) <br> 1 1 | IDLE (1b) <br> 1 |
| CLOCK 168 <br> 822 <br> SVTI REG: <br> SVTO REG: <br> SVTO SVTI | SLAVE 1 2ND TEL[0] <br> X | IDLE (1b) <br> SLAVE 0 HEADER[7] <br> 1 1 | IDLE (1b) <br> IDLE (1b) <br> 1 1 | IDLE (1b) <br> IDLE (1b) <br> 1 1 | IDLE (1b) <br> 1 |
| CLOCK 176 <br> 823 <br> SVTI REG: <br> SVTO REG: <br> SVTO SVTI | SLAVE 0 HEADER[0] <br> 0 | IDLE (1b) <br> IDLE (1b) <br> 1 1 | IDLE (1b) <br> IDLE (1b) <br> 1 1 | IDLE (1b) <br> IDLE (1b) <br> 1 1 | IDLE (1b) <br> 1 |
| CLOCK 177 <br> 824 <br> SVTI REG: <br> SVTO REG: <br> SVTO SVTI | IDLE (1b) <br> 1 | IDLE (1b) <br> IDLE (1b) <br> 1 1 | IDLE (1b) <br> IDLE (1b) <br> 1 1 | IDLE (1b) <br> IDLE (1b) <br> 1 1 | IDLE (1b) <br> 1 |

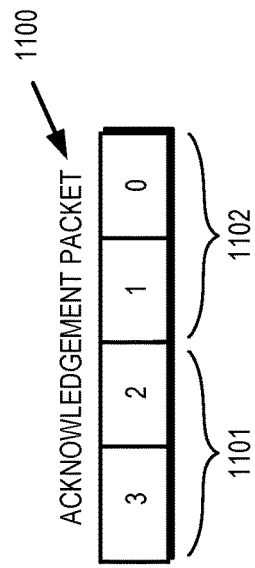

| CLOCK | | MASTER 1201 | SLAVE 1 1202 | SLAVE 2 1203 | SLAVE 3 1204 | SLAVE 4 1205 |
|---|---|---|---|---|---|---|
| CLOCK 152 1211 | SVTI REG: SVTO REG: SVTO SVTI | SLAVE 1 1ST TEL[0] 1251 X 1252 | IDLE (1b) SLAVE 1 2ND TEL[15] X | IDLE (1b) IDLE (1b) 1 | IDLE (1b) IDLE (1b) 1 | IDLE (1b) 1231 1 1232 |
| CLOCK 153 1212 | SVTI REG: SVTO REG: SVTO SVTI | SLAVE 1 2ND TEL[15] X | IDLE (1b) SLAVE 1 2ND TEL[14] X | IDLE (1b) IDLE (1b) 1 | IDLE (1b) IDLE (1b) 1 | 1233 ACK[3] 0 1234 |
| CLOCK 154 1213 | SVTI REG: SVTO REG: SVTO SVTI | SLAVE 1 2ND TEL[14] X | IDLE (1b) SLAVE 1 2ND TEL[13] X | IDLE (1b) IDLE (1b) 1 | ACK[3] IDLE (1b) 1 | ACK[2] 0 |
| CLOCK 158 1214 | SVTI REG: SVTO REG: SVTO SVTI | SLAVE 1 2ND TEL[10] X | ACK[3] SLAVE 1 2ND TEL[9] X | ACK[1] ACK[2] 0 | IDLE (1b) ACK[0] 0 | IDLE (1b) 1239 1 |
| CLOCK 159 1215 | SVTI REG: SVTO REG: SVTO SVTI | SLAVE 1 2ND TEL[9] X | ACK[2] SLAVE 1 2ND TEL[8] X | ACK[0] ACK[1] 0 | IDLE (1b) IDLE (1b) 1 | IDLE (1b) 1 |
| CLOCK 160 1216 | SVTI REG: SVTO REG: SVTO SVTI | SLAVE 1 2ND TEL[8] X | ACK[1] SLAVE 1 2ND TEL[7] X | IDLE (1b) ACK[0] 1 | IDLE (1b) IDLE (1b) 1 | IDLE (1b) 1 |
| CLOCK 161 1217 | SVTI REG: SVTO REG: SVTO SVTI | SLAVE 1 2ND TEL[6] X | ACK[0] SLAVE 1 2ND TEL[6] X | IDLE (1b) IDLE (1b) 1 | IDLE (1b) IDLE (1b) 1 | IDLE (1b) 1 |
| CLOCK 167 1218 | SVTI REG: SVTO REG: SVTO SVTI 1254 | SLAVE 1 2ND TEL[1] X | IDLE (1b) SLAVE 1 2ND TEL[0] 1 | IDLE (1b) IDLE (1b) 1 | IDLE (1b) IDLE (1b) 1 | IDLE (1b) 1 |

| | | MASTER 1201 | SLAVE 1 1202 | SLAVE 2 1203 | SLAVE 3 1204 | SLAVE 4 1205 |
|---|---|---|---|---|---|---|
| CLOCK 168 1219 | SVTI REG: SVTO REG: SVTO SVTI | SLAVE 1 2ND TEL[0]<br>X | IDLE (1b) 1<br>ACK[3] 0 | IDLE (1b) 1<br>IDLE (1b) 1 | IDLE (1b) 1<br>IDLE (1b) 1 | IDLE (1b) 1 |
| CLOCK 169 1220 | SVTI REG: SVTO REG: SVTO SVTI | ACK[3] 0 | IDLE (1b) 1<br>ACK[2] 0 | IDLE (1b) 1<br>IDLE (1b) 1 | IDLE (1b) 1<br>IDLE (1b) 1 | IDLE (1b) 1 |
| CLOCK 170 1221 | SVTI REG: SVTO REG: SVTO SVTI | ACK[2] 0 | IDLE (1b) 1<br>ACK[1] 0 | IDLE (1b) 1<br>IDLE (1b) 1 | IDLE (1b) 1<br>IDLE (1b) 1 | IDLE (1b) 1 |
| CLOCK 171 1222 | SVTI REG: SVTO REG: SVTO SVTI | ACK[1] 0 | IDLE (1b) 1<br>ACK[0] 1 | IDLE (1b) 1<br>IDLE (1b) 1 | IDLE (1b) 1<br>IDLE (1b) 1 | IDLE (1b) 1 |
| CLOCK 172 1223 | SVTI REG: SVTO REG: SVTO SVTI | ACK[0] 1255<br>1 | IDLE (1b) 1<br>SLAVE 0 HEADER[7] 1 | IDLE (1b) 1<br>IDLE (1b) 1 | IDLE (1b) 1<br>IDLE (1b) 1 | IDLE (1b) 1 |
| CLOCK 173 1224 | SVTI REG: SVTO REG: SVTO SVTI 1253<br>1254 | SLAVE 0 HEADER[7] 1 | IDLE (1b) 1<br>SLAVE 0 HEADER[6] 1 | IDLE (1b) 1<br>IDLE (1b) 1 | IDLE (1b) 1<br>IDLE (1b) 1 | IDLE (1b) 1 |

SLAVE-TO-MASTER DATA AND OUT-OF-SEQUENCE ACKNOWLEDGEMENTS ON A DAISY-CHAINED BUS

BACKGROUND

Various techniques and protocols have been used to facilitate wired communication between devices. One of those protocols is the Serial VID Interface version 2 (SVI2) protocol for use in hardware platforms for managing power. The SVI2 protocol suffers from certain limitations including a lack of scalability and a lack of flexibility in terms of communication between devices and support for a variable number of devices that need to be coupled together on a communication bus. As a specific example, telemetry in the SVI2 protocol is only available from two slaves per physical master device. Further, each slave device on a bus complying with the SVI2 protocol must send a same number of packets and a same type of packets to another device per communication cycle.

Another protocol in use is the PMBus protocol. The PMBus protocol is an open-standard digital power management protocol that is simple and programmable. The PMBus protocol connects a single master to a scalable number of slaves through a 2-wire interface. However, the bi-directional nature of the PMBus interface, and the requirement to individually poll each slave and data type, causes communication transfer rates to be limited.

Another protocol in use is the AVS Bus protocol, which is a sub-set of the Power Management Bus (PMBus) protocol. The AVS Bus protocol is a 3-wire communication protocol that facilitates faster data transmission. However, the PMBus protocol also has limitations. For example, in terms of the number of physical devices that can exist, the AVS Bus protocol is not scalable. Telemetry data are only available from one physical device in the AVS Bus protocol. Further, each data type must be polled individually and each data packet must be of an equal length. The bit counts of the AVS Bus protocol packets are not optimal. Generally, there is a high amount of overhead when considering data transmissions in the AVS Bus protocol.

In two- and three-wire bi-directional communication systems, limitations related to scalability and/or speed exist. An improved communication protocol is needed for communication between a master controller and multiple power management devices, such as voltage regulators, power management integrated circuits (PMICs), power monitors, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIGS. 8 and 9 together illustrate a chart of example telemetry input and output values for master and slaves in accordance with some embodiments at several clock times illustrating data packet transfer operations.

FIG. 10 illustrates a chart of example clock times associated with packets transferred in a system employing a bus with a single master and multiple slaves in accordance with some embodiments.

FIG. 11 is a block diagram illustrating an acknowledgement packet in accordance with some embodiments.

FIGS. 12 and 13 together illustrate a chart of example telemetry input and output values for master and slaves in accordance with some embodiments at several clock times illustrating acknowledgement packet operations.

FIG. 14 is a chart illustrating example clock times and packets received by a master of the system of FIG. 1 in accordance with some embodiments.

DETAILED DESCRIPTION

Figure 1:
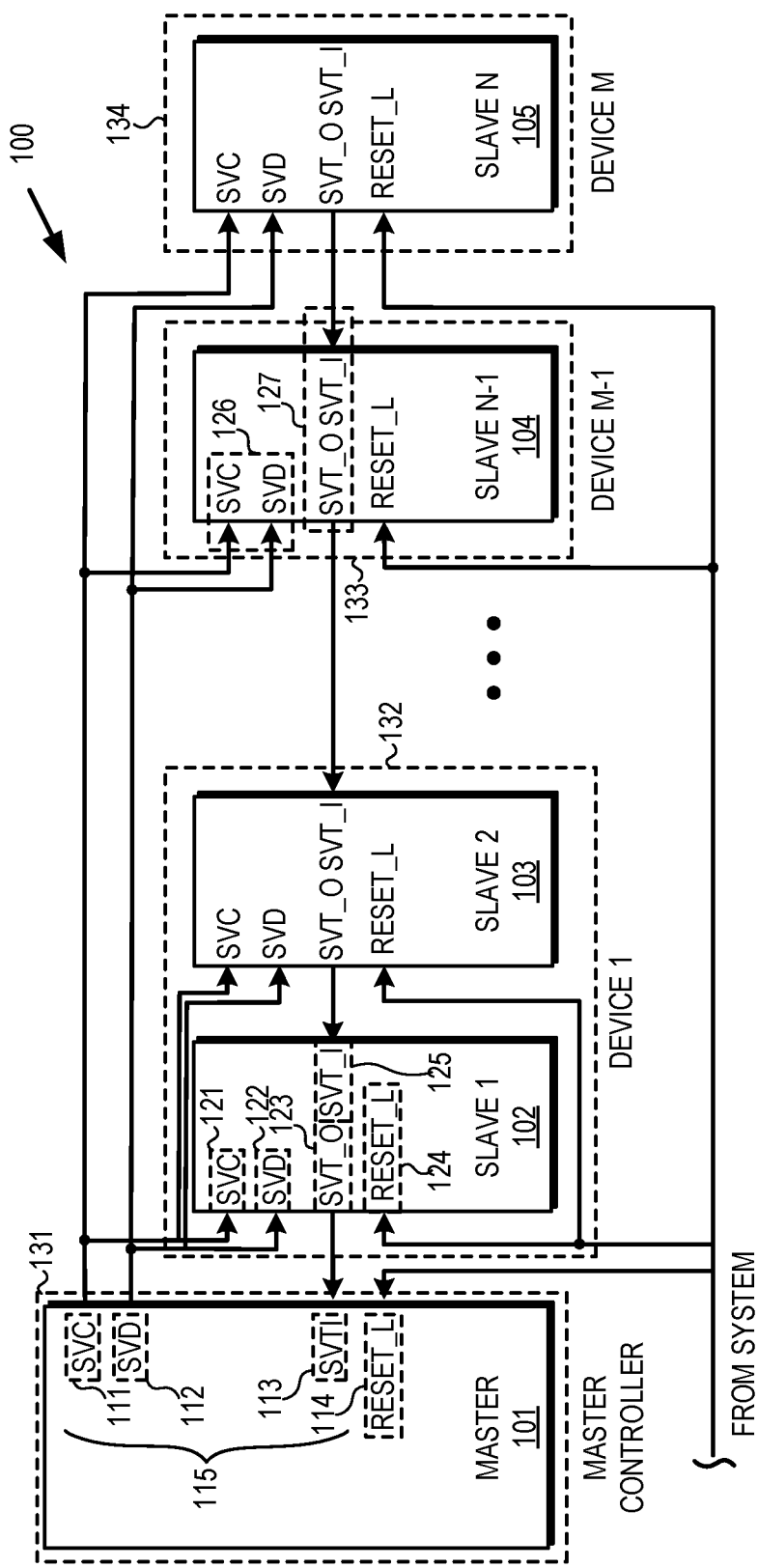
FIG. 1 is a block diagram illustrating a system employing a bus with a single master and multiple slaves in accordance with some embodiments.

Described herein are methods, systems, and electronic devices for implementation at, for example, a hardware platform level. The methods, systems, and devices facilitate high-speed communication between a master controller and multiple slave devices. Slave devices are also described herein as reporting devices. Described techniques involve transmitting signals synchronously to the slave devices on a first component and transmitting data from the multiple slaves on a second daisy-chained component while allowing for out-of-sequence top-priority acknowledgement packets to be transmitted on the same component. The second daisy-chained component alternatively is referred to as a daisy-chained bus or a daisy-chained interface. A result is a communication protocol that allows for a significantly increased transfer speed to a single-master from multiple slaves by supporting bi-directional communication with only unidirectional, push-pull connections between devices. According to certain embodiments, the master is coupled to each slave by synchronous outbound unidirectional signaling, and the master is coupled to one of the slaves by synchronous inbound unidirectional signaling.

Using unidirectional, push-pull connections between devices described herein provides an efficient method for each slave to communicate information back to the master. Various actions facilitate transfer of packets sent contiguously downstream, one packet after another packet, from slave to slave until reaching the master. For example, outgoing unidirectional connections are connected in a star-pattern from a master to each slave. In the inbound direction, each of the slaves and the master are daisy-chained together with a respective unidirectional connection from each slave to a respective downstream slave toward the master until a closest slave in the sequence of inbound data traffic is coupled to the master.

According to some embodiments, a communication stream is initiated by signaling a last slave in a daisy-chained arrangement of slaves, referred to herein as a daisy-chained network, by way of a first component to trigger sending data packets down a pipeline to the master by way of a second component. When finished sending data, the last slave transmits a signal packet up the pipeline to act as a start signal to a next slave. This signal packet is referred to herein as a header packet. The header packet indicates to the next slave to begin its data transmission. The next slave in the pipeline adds to the growing communication stream of data after the next slave processes the header packet. This pattern in the daisy-chained network of slaves continues until the slave closest to the master finishes sending its data to the master via the pipeline and then the slave closest to the master sends a slave-zero packet to the master indicating an end to the data transmission. A result is that the master observes a long, continuous data stream of packets contiguously strung together, the communication stream including contributions from each slave and ending with a slave-zero packet.

According to certain embodiments, the methods, systems, and electronic devices also allow any slave in the daisy-chained system to insert an acknowledge packet within a current data stream being propagated to the master from the slaves. This approach allows for the insertion of this acknowledge packet out-of-sequence into the communication stream. Thus, the master receives the acknowledge packet quickly and without delay or interference by transmission of a continuous data stream. For example, a particular slave is not required to wait until the particular slave receives its header packet before sending its acknowledge packet. A result of allowing for out-of-order acknowledge packets is a protocol that has the advantages of bi-directional communication, communication acknowledgements, and high data transfer speeds.

FIG. 1 illustrates a block diagram of a system 100 in accordance with some embodiments. The system 100 includes a single master 101 and a plurality of slaves, such as slaves 102-105. In an outbound direction, the master 101 is coupled to the slaves 102-105 according to a star pattern such that each star node (slaves 102-105) is directly coupled to the master 101. In an inbound direction, the master 101 is in serial communication with the slaves 102-105 via a daisy-chained bus 127 between the slaves 103-105 and between a closest slave 102 and the master 101 ("closest" being in a signaling distance sense, rather than with reference to physical proximity).

The system 100 includes a three-wire serial bus 115 designed to support bi-directional data transfer between the master 101 and the slaves 102-105. The three-wire serial bus 115 from the perspective of the master 101 includes at least three wired connections that include a serial voltage identification (VID) clock (SVC) 111, a serial VID data line (SVD) 112, and a serial telemetry component such as inbound VID input (SVTI) 113 of the master 101. Together, the SVC 111 and the SVD 112 of the master 101 are referred to as a first bus 126 and are used for outbound communication to the slaves 102-105. The SVC 111 and the SVD 112 are connected from the master 101 to each slave 102-105 in the star pattern. Each of the slaves 102-105 derives a timing signal from the clock signal received via the SVC 111 of the master 101. The SVTI 113 of the master 101 serves to receive inbound communication from the slaves 102-105. The master 101 and each of the slaves 102-105 also include a respective reset line (RESET_L) 114, 124.

Each slave 102-105 includes a similar set of components as the master 101 including: an SVC 121, an SVD 122, a serial telemetry VID output (SVT_O) 123, and a serial telemetry VID input (SVT_I) 125. From the perspective of the slaves 102-105, the SVC 121 and the SVD 122 are referred to at various places herein as the first bus 126 and are for outbound signals from the master 101. Together, a pair of SVT_O 123 and SVT_I 125 are referred to at various places as a second bus 127 for inbound signals or packets communicated between slaves 102-105 and from a closest slave 102 to the master 101. Generally, the SVT_O 123 of each slave 102-105 is coupled to the SVT_I 125 of another slave. The SVT_O 123 of a slave 102 closest to the master 101 is coupled to the SVTI 113 of the master 101. Data returning to the master 101 are sent synchronously and serially by and through a sequence of the slaves 102-105 that are arranged and connected in a serial daisy-chain pattern to the master 101, with this arrangement referred to as a telemetry daisy-chain. Data are sent from each slave 102-105, starting with the terminal slave 105 in a system capable of supporting an arbitrary number N of slaves. To facilitate daisy-chaining, each slave 102-105 has two daisy-chain inputs/outputs (I/Os): the SVT_I connection 125 and the SVT_O 123.

While not depicted for ease of illustration, the master 101 and each slave 102-105 includes a voltage digital-data I/O (VDDIO) that serves as a reference voltage for all signals as understood by those in the art. Specifically, the VDDIO serves as the reference for the RESET_L 114, 124; the SVC 111, 121; the SVD 112, 122; the SVTI 113; the SVT_I 125; and the SVT_O 123. The SVC 111 includes a push-pull signal which acts as a clock for the SVD 112, 122; the SVTI 113; the SVT_I 125; and the SVT_O 123. The SVD 112 includes a push-pull signal which transmits commands from the master 101 to the slaves 102-105. Each SVT_I 125 is driven by the next-furthest slave from the master 101 on the telemetry daisy-chain. Each SVT_I 125 carries telemetry and acknowledge packets to the SVTI 113 of the master 101. The SVT_O 123 is a push-pull output driven by each slave 102-105. The SVT_O 123 carries telemetry and acknowledge packets. An active low signal on the RESET_L 114, 124 triggers all state machines and registers to reset to default states. For example, when each of the slaves 102-105 receives an active signal on its reset line, each slave 102-105 set its registers to a default state such as to a value of zero, a value of one, or another state. The terminal slave 105 plays a particular role in data transmission and acknowledgement procedures. The SVT_I 125 of the terminal slave 105 is grounded allowing the terminal slave 105 to be aware of its position in the system 100.

In some implementations of the system 100, two or more slaves, such as slave 102 and slave 103, reside in a same physical integrated circuit (IC) device 132. For example, a single voltage regulator controller 131 may regulate two independent voltage rails, meaning that the two slaves 102, 103 reside in a same die and are subject to a same voltage controller of the first physical IC device 132, which is labeled as device 1. A second physical IC device 133, numbered M-1, operates the second-to-last slave (i.e., slave 104), and another (third) physical IC device 134, numbered M, operates the terminal slave 105. For a physical IC device that has two or more slaves residing therein, only a single set of SVC 121, SVD 122, SVT_I 125 and SVT_O 123 physical pins are required. Internal to the first physical IC device 132, the SVC 121 and the SVD 122 are routed in a star pattern to each slave 102, 103. For example, a daisy-chained link between the first slave 102 and the second slave 103 is included internal to the first physical IC device 132.

In the system, the master 101 and slaves 102-105 follow an addressing convention. According to some embodiments, and by way of example, an addressing convention includes a set of valid slave addresses that range from 01h upward where the first two digits are hexadecimal. Address 00h is a reserved address designation. The set of slave addresses is limited by a size of a header packet data payload. Addressing is not arbitrary. As shown in FIG. 1, slaves 102-105 are addressed by their position in the daisy-chain system 100 with the furthest slave from the master 101, the terminal slave 105, having a greatest address value (e.g., 0Ah, 06h, and 04h). If multiple slaves are present in a single physical device, such as slaves 102, 103 within the first physical IC device 132, the slaves 102, 103 typically consume multiple consecutive addresses.

In terms of initialization and assigning of an address, the following is an illustrative example of initialization and addressing. A bus initialization procedure is designed with a goal of ensuring that all signals are connected properly and are stable before communication occurs. The bus initialization procedure also automatically addresses each slave based on the slave's position in the daisy-chained system 100. Bus initialization and slave enumeration is completed before a subsequent command and before a data telemetry is transmitted. An assertion of the RESET_L 114, 124 does not reset slave addresses, and additional slave enumeration is not required.

According to certain embodiments, a communication protocol requires that each slave be addressed based on its position in the daisy-chained system 100. After bus initialization, the master 101 begins enumerating and addressing the slaves as follows, if needed. The master 101 transmits a start packet, a global initialization packet, and an end packet via the SVC 121 and SVD 122 (the SVC/SVD bus 126 as a first component of each device—master and slave). All slaves listen for these packets. In response, non-terminal slaves enter a pipelining mode. Un-initialized slaves listen to the SVC/SVD bus 126 and ignore all command packets except the global initialization packet. The terminal slave 105 begins transmitting a start packet, followed by a single 0b, on its SVT_O 123. Together, the SVT_I 125 and the SVT_O 123 are the SVTI/SVTO bus 127 as a second component of the master and a second component of each slave.

Following transmitting the start packet, the terminal slave 105 continues transmitting an idle transmission value of 1b. The next slave 104 pipelines through the start packet and begins counting a number of value 0b received. For every 0b observed, the next slave 104 increments its address offset register. When the slave 104 observes the first 1b value on its SVT_I 125, the observing slave discards the first 1b value and transmits or replaces the first 1b value with a single 0b on its SVTO output in the pipeline. Following the value 0b above-mentioned bit flip transmission, a non-terminal slave 102-104 resumes pipelining. All non-terminal slaves 102-104 follow this behavior until a first or closest slave 102 pipelines a packet to the master 101 that consists of a start packet followed by an arbitrary number N of instances of value 0b. The master 101 confirms that the number of 0b values is as expected and transmits a start packet, an address packet, and an end packet. A data payload of the address packet is equal to the number of slaves (number of 0b values). Every slave 102-105 listens to the address packet. Each slave 102-105 is addressed as the address packet payload minus their respective address offset. All slaves 102-105 then exit the initialization mode and follow standard protocol rules as further described herein. The master 101 then waits zero to a minimum threshold number of cycles before sending any additional commands. The slave 102-105 enumeration procedure allows for automatic addressing of each slave on the SVTI/SVTO bus as well as confirming that the SVTI/SVTO bus is functioning and connected correctly.

Embodiments of a daisy-chained data transmission protocol described herein allows each slave, such as slaves 102-105, to each report an arbitrary amount of data to the master 101. This protocol provides system flexibility since some types of information may not be useful from all slaves 102-105. For example, there may be limited value of continuously reporting a temperature value from a low-power auxiliary point-of-load converter. In each slave 102-105, slave-specific registers control which types of data each slave 102-105 is to transmit when prompted to transmit its data.

Figure 2:
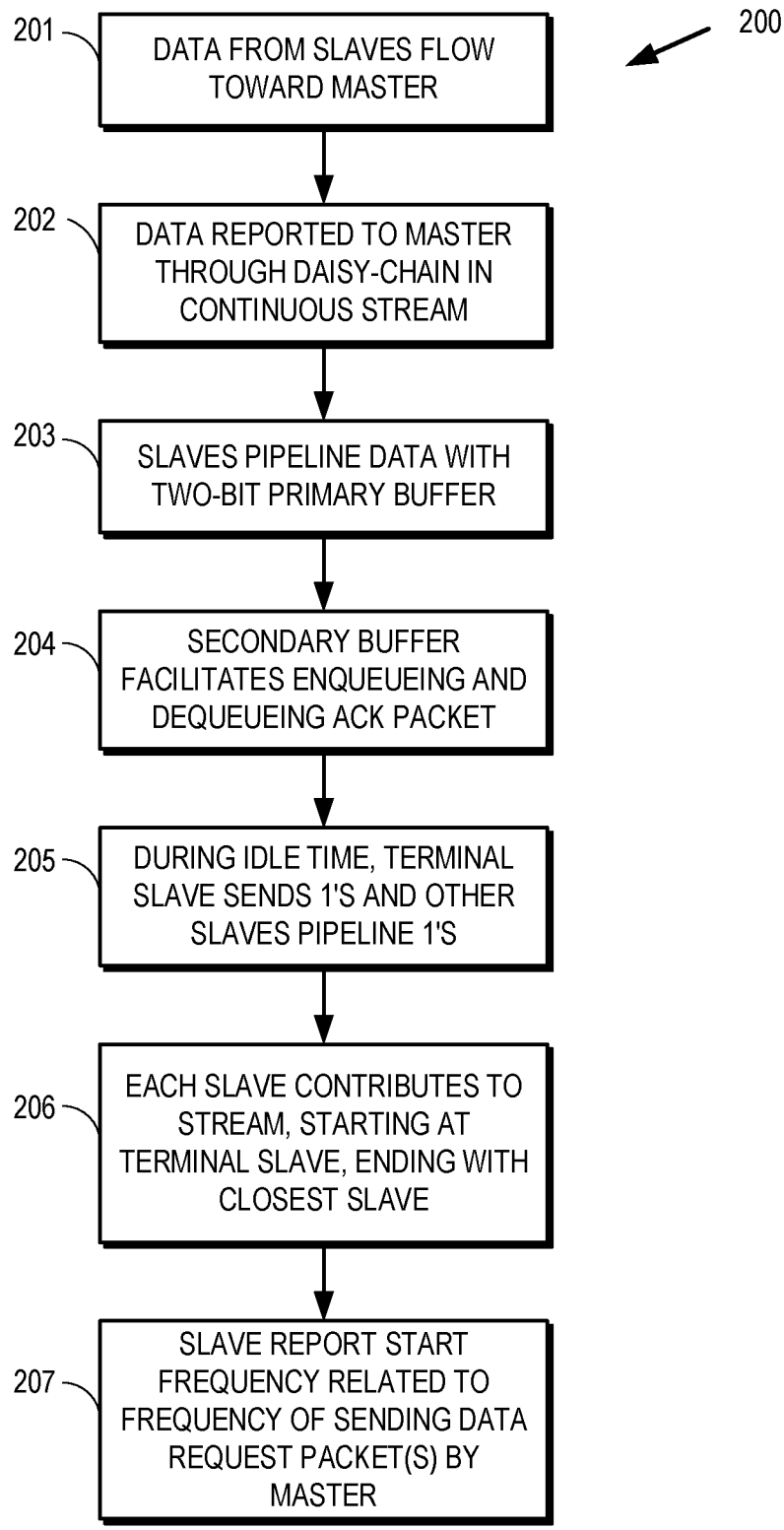
FIG. 2 is a flow diagram illustrating a method for data transmission operations for the system of FIG. 1 in accordance with some embodiments.

FIG. 2 is a flow diagram illustrating a method 200 for data transmission operations in accordance with some embodiments of a system. For ease of reference, the method 200 is described in the example context of the system 100 of FIG. 1. For a set of devices such as the master 101 and the slaves 102-105 of FIG. 1, one of the buses of the master 101 and the slaves 102-105 is a daisy-chained bus. At block 201, inbound data from the slaves 102-105 flow toward the master 101. At block 202, data are reported to the master 101 through a daisy-chained network of slaves 102-105 in a continuous data stream. At block 203, each slave 102-104 pipelines data with a two-bit primary buffer. Other sizes of primary buffer are used in other embodiments. Generally, depending on an application and particular embodiment, a primary buffer of a device may buffer data before, during, or after transmission. For example, at block 204, a four-bit secondary buffer facilitates enqueueing and dequeuing a four-bit acknowledgement packet which is sent out-of-sequence from the continuous data stream of pipelined data as further described herein in relation to other figures. At block 205, when the devices 101-105 are idle, such as between times of participating in pipelining of a data stream, the terminal slave 105 transmits a single value (e.g., 1b, 0b where "b" refers to binary notation) and all other slaves 102-104 pipeline the value toward the master 101. At block 206, each slave 102-105 contributes to the pipelined data stream, starting with the terminal slave 105 and ending with the slave 102 closest to the master 101. And, according to certain embodiments, at block 207, a frequency at which the data stream to the master 101 begins, a report rate, is related to a frequency at which the master 101 issues a data request packet on the SVC/SVD bus 126 to the slaves 102-105.

Figure 3:
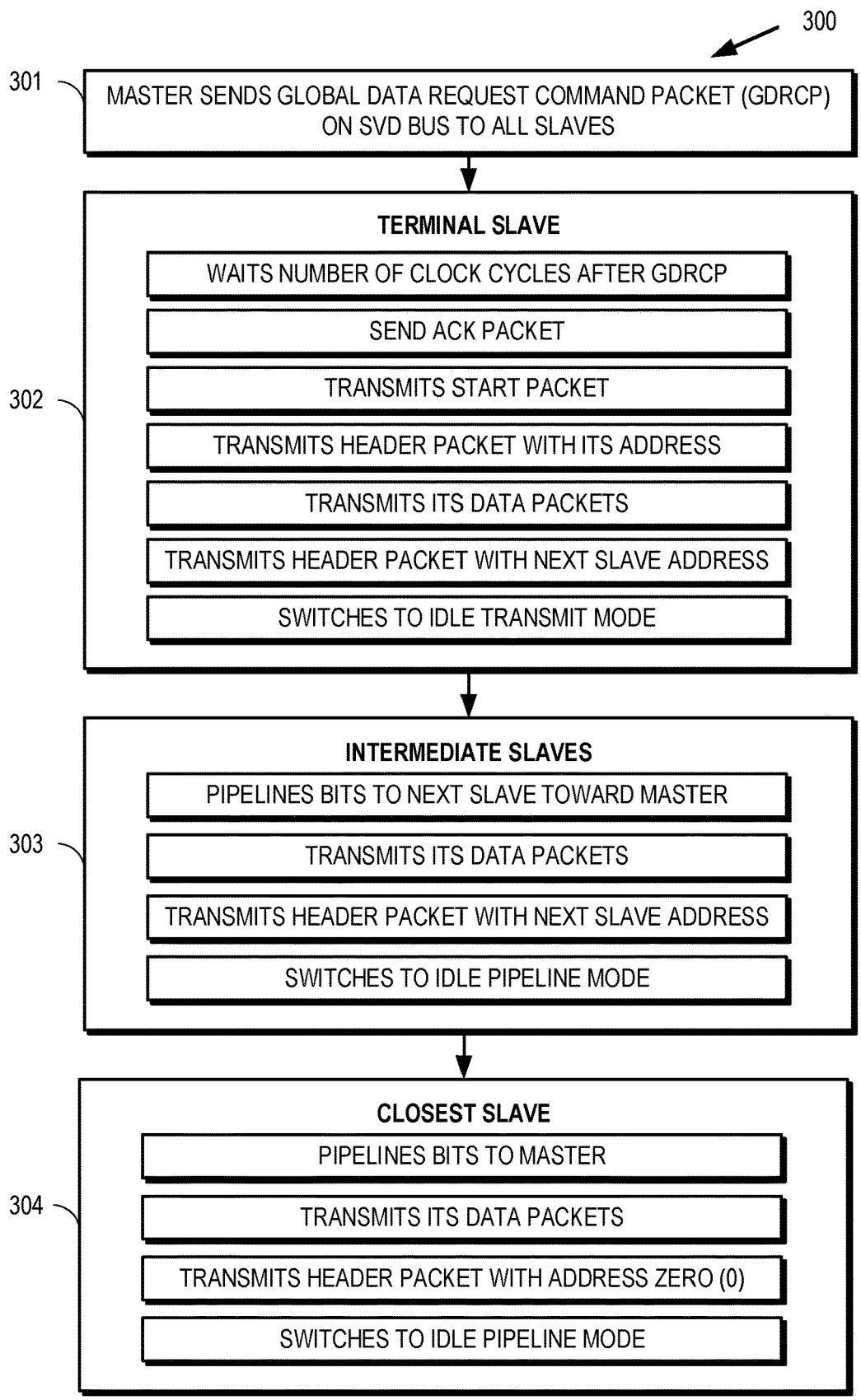
FIG. 3 is a flow diagram illustrating a method for data stream creation for the system of FIG. 1 in accordance with some embodiments.

FIG. 3 is a flow diagram illustrating a method 300 for data stream creation in accordance with some embodiments. For ease of reference, the method 300 is described in the example context of the system 100 of FIG. 1. For a set of devices, such as devices 101-105, of FIG. 1, the master 101 sends a command packet on the SVC/SVD bus 126 to the slaves 102-105. Upon receipt, each of the slaves 102-105 prepares for reporting to the master 101. In turn, each slave 102-105 transmits its data to the master 101 starting at the terminal slave 105 and proceeding in reverse order, all preceding slaves pipelining the data passed toward the master 101.

More specifically, at block 301, the master 101 sends a global data request command packet (GDRCP) on the SVC/SVD bus 126 connecting each slave 102-105 with the master 101. The global data request command packet indicates to all slaves 102-105 to prepare for reporting which ensures that the data held by each slave is ready for transmission to the master 101.

At block 302, the terminal slave 105 performs certain actions including sending an acknowledge packet (as further described herein) and waiting for a pre-determined number of clock cycles after receiving the GDRCP before taking further actions. After a "wait" or delay of 0 or more number of clock cycles, the terminal slave 105 then transmits: a start packet (e.g., a two-bit 01b packet, a four-bit 0100b packet), a header packet with a terminal slave address, all data packets enabled for the terminal slave 105, and a header packet with a next slave address (i.e., slave 104). Finally, the terminal slave 105 switches into an idle transmit mode until receiving a further signal from the master 101 or other device. According to some embodiments, the idle transmit mode is transmission of a continuous data stream of the value 1. According to preferred embodiments, the data packets are sent back-to-back, without interruption, in any order. Illustrative packet formats are further described herein in relation to other figures.

At block 303, while the terminal slave 105 is transmitting, each of the other slaves 102-104 is pipelining bits on its SVT_I 125 and SVT_O 123 while listening for its own header packet. After the respective slave 102-104 reads its own header packet, the respective slave performs certain actions including: transmitting all of its data packets enabled for that particular slave, and transmitting a header packet with the next slave address. After the respective slave transmits the header packet of the next slave, the slave 102-104 switches into an idle transmit mode until receiving a further signal from the master 101 or other device. According to some embodiments, the data packets are sent back-to-back, without interruption, in any order.

At block 304, while each upstream slave 103-105 is pipelining, the first slave 102 that is closest to the master 101 is pipelining bits on its SVT_I 125 and SVT_O 123 to the master 101 while listening for its own header packet. After the first slave 102 pipelines and reads its own header packet, the first slave 102 performs certain actions including: transmitting all data packets enabled for the first slave 102 to the master 101, and transmitting a header packet with a slave address 0 which indicates the end of the data stream. According to embodiments, the data packets from the first slave are sent back-to-back, without interruption, in any order.

According to some embodiments, after the end of the data stream, the slaves 102-105 enter an idle transmit mode where the SVC/SVD bus 126 between devices 101-105 remains idle, the terminal slave 105 transmits 1b, and all non-terminal slaves 102-104 pipeline the 1b until the master 101 sends another data request packet or an acknowledgement is required to be returned as further described herein. The entire data stream is proceeded by a start packet (e.g., 01b, 0100b). Individual data packets within the data stream are not preceded by a start packet—one start packet is provided at a head of each data stream. The receipt of a header packet with address zero (0) signifies to the master 101 that the data stream is complete. Each header packet indicates to the master 101 from which slave 102-105 the following data packets were reported. Each header packet signifies a beginning of a series of data packets from the respective slave 102-105. Individual data packets are framed by counting bits. That is, according to certain embodiments, each data packet is of a known, predetermined size known by the master. However, depending on the type of packet, the bit length varies for each packet type. Each slave 102-105 and the master 101 count bits and compare the bit count to pre-defined packet lengths for proper packet framing. The following description and FIGS. 4-7, and FIG. 11 provide examples of types of packets that the system and protocol may send and receive. However, the system and protocol allow for numerous packet sizes and packet types.

Figure 4:
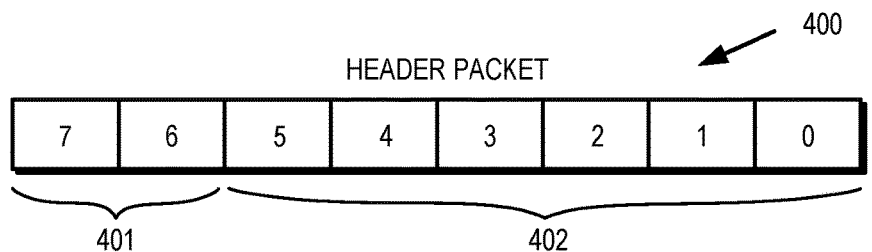
FIG. 4 is a block diagram illustrating a header packet in accordance with some embodiments.

FIG. 4 is a block diagram of a header packet 400 with a 6-bit address payload in accordance with some embodiments. The header packet 400 specifies an address of the slave 102-105 from which the following data packets are reported. The header packet 400 is eight bits long. From left to right, the first two bits are packet-type bits 401 at positions 7,6 which indicate a packet type. For the header packet 400, the packet-type bits 401 have values of 1,1. Other values of these bits would indicate another type of packet. For example, values of 0,0 correspond to an acknowledge packet, and values 1,0 correspond to a telemetry data packet. The last six bits at positions 5:0 inclusively are the address bits 402 of the header packet 400 and encode the address of the respective slave 102-105 in the system 100.

Figure 5:
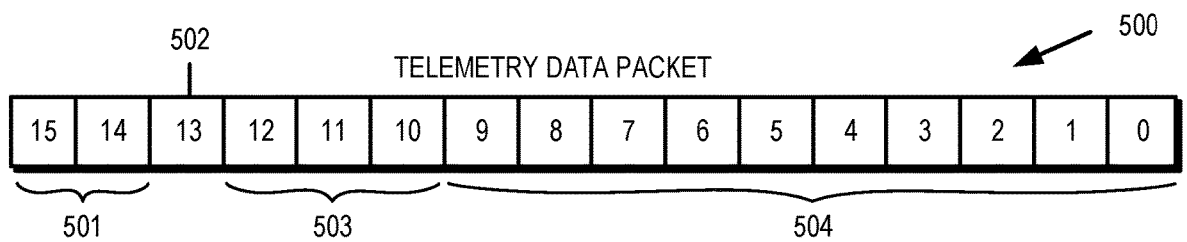
FIG. 5 is a block diagram illustrating a telemetry data packet in accordance with some embodiments.

FIG. 5 is a block diagram of a telemetry data packet 500 with a 10-bit payload and a 16-bit length in accordance with some embodiments. The telemetry data packet 500 includes two bits which are packet-type bits 501 at position 15,14 that indicate a packet type. In this embodiment, values of 1,0 indicate a telemetry data packet. One expansion bit 502 at position 13 indicates whether the packet is an expanded telemetry data packet or not with a value of 1 indicating an expanded telemetry data packet as in FIG. 6 and a value of 0 indicating the telemetry data packet 500. Three index bits at 503 are found at positions 12:10 inclusively. The last ten bits at positions 9:0 inclusively are the telemetry data bits 504 of the telemetry data packet 500 and encode data sent to the master 101.

Figure 6:
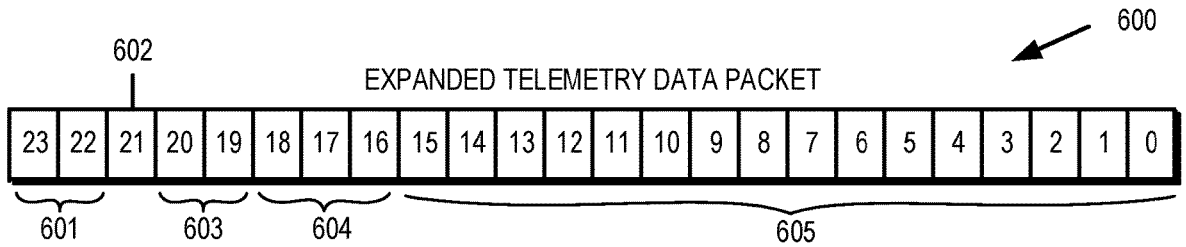
FIG. 6 is a block diagram illustrating an expanded telemetry data packet in accordance with some embodiments.

FIG. 6 is a block diagram of an expanded telemetry data packet 600 with a 16-bit payload and a 24-bit length in accordance with some embodiments. The expanded telemetry data packet 600 includes two bits which are packet-type bits 601 at positions 23,22 that indicate a packet type. Values of 1,0 at positions 23,22 indicate a telemetry data packet, and in this embodiment, an expanded telemetry data packet. Other values at positions 23,22 indicate other types such as values 0,0 for an acknowledge packet and values 1,1 for a header packet. One expansion bit 602 at position 21 and a value of 1 indicates that the expanded telemetry data packet 600 is an expanded telemetry data packet. Two bits for an expanded telemetry type 603 are found at positions 20,19. Values of 0,0 at positions 20,19 indicate a 16-bit telemetry, values of 0,1 and 1,0 are reserved, and values of 1,1 indicate a register-readback data packet 700 as in FIG. 7. Three telemetry register index bits 604 at positions 18:16 inclusively communicate a type of telemetry for this packet 600. The last sixteen bits at positions 15:0 inclusively are the telemetry data bits 605 of the expanded telemetry data packet 600 and encode data sent to the master 101.

Figure 7:
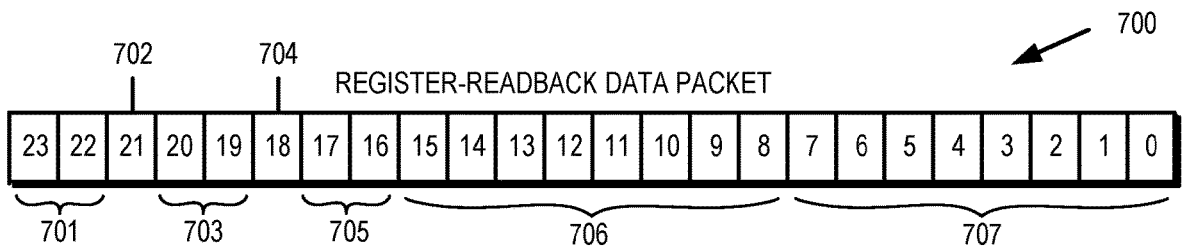
FIG. 7 is a block diagram illustrating a register-readback data packet in accordance with some embodiments.

FIG. 7 is a block diagram of a register-readback data packet 700 with an 8-bit payload and a 24-bit length in accordance with some embodiments. The register-readback data packet 700 includes two bits which are packet-type bits 701 at positions 23,22 that indicate a packet type. Values of 1,0 at positions 23,22 indicate a telemetry data packet, and in this embodiment, the register-readback data packet 700. Other values at positions 23,22 indicate other packet types such as values 0,0 for an acknowledge packet and values 1,1 for a header packet. One expansion bit 702 at positions 21 and a value of 1 indicates that the packet 700 is an expanded telemetry data packet. Two bits for an expanded telemetry type 703 are found at positions 20,19. Values of 1,1 indicate that the packet 700 is a register-readback data packet. One customization bit 704 is found at positions 18. In some embodiments, the customization bit 704 has a value of 0 or value of 1 and is used in combination with two reserved bits 705 at positions 17,16. The last sixteen bits at positions 15:0 inclusively are broken into two sections. Register index bits 706 are found at positions 15:8 inclusively, and register data bits 707 are found at positions 7:0 inclusively. The register data bits 707 are the payload of the packet 700 sent to the master 101. According to some embodiments, the register data bits 707 encode data from a register of the particular slave 102-105, the register indicated by the register index bits 706. A register-readback data packet 700 relates to a most recent register readback command sent to the particular slave 102-105. If no register readback command has been received since the last telemetry request, no packet 700 is sent. To prevent a race condition with other slaves reporting data, the particular slave only reports read-back packets 700 pertaining to a register read-back sent prior to a most recent telemetry request. If a slave 102-105 receives a register read-back command after receiving another type of telemetry request, but before reporting its own telemetry, the particular slave waits until a subsequent telemetry request to send its data responsive to the register-readback data packet 700.

FIGS. 8 and 9 together illustrate a chart 800 showing telemetry input and output values for master and slaves in accordance with some embodiments at several clock times illustrating data packet transfer operations. Across a top of the chart 800 are represented a master 801 that is receiving packets, binary bit by binary bit, from slaves 802-805 on its SVTI 853 as indicated by an SVTI value 852. The master 801 is a device such as the master 101, and slaves 802-805 are slaves such as the slaves 102-105. An SVTI descriptor 851, indicated as "SVTI REG," corresponds to and describes the SVTI value 852. An SVTO descriptor 831, indicated as "SVTO REG," corresponds to and describes the SVTO value 832. An "X" in the SVTI value 852 or the SVTO value 832 indicates that the value is one of value 0 or value 1. While the master 801 only uses an SVTI 853, each of the slaves 802-805 includes and uses both an SVTI 853 and an SVTO 854.

The chart 800 includes values at various clock times 811-818, one clock time per row, as indicated in the first (left) column. At a clock time before clock time 0 811, the system including the master 801 and the slaves 802-805 is in an idle transmit mode in which the terminal or last slave 805 is transmitting an SVTO value 832 such as a value 1 at each clock cycle. Each of the SVTIs 853 and SVTOs 854 of the slaves 802-805 and the SVTI 853 of the master 801 are registering the value 1 in the idle transmit mode. Sometime before clock time 0, the terminal slave 805 is signaled to enter a data transmit mode. For sake of illustration, each of the slaves 802-805 have two telemetry data packets to send to the master 801.

At a second clock time 812 corresponding to value 0, the terminal slave 805 begins transmitting a start packet having a two-bit packet size. A first bit of value 0 and as indicated by "START PACKET[1]" 833 in the SVTO REG descriptor field is transmitted by the terminal slave 805 at its SVTO 854. At two clock ticks later, at a third clock time 813, the bits of the start packet, having values of 0,1 at positions 1,0 (respectively), have been propagated to the third slave 804, and the fourth and terminal slave 805 begins to transmit data. In particular, following the actions of block 302 shown in FIG. 3 and described in relation to the method 300 for data stream creation, at the third clock time 813, the terminal slave 805 is transmitting a first bit of a fourth slave header packet as indicated by "SLAVE 4 HEADER[7]" 834 in its SVTO REG descriptor field.

Four clock ticks later, at a fourth clock time 814, the values of the packet bits have been propagated toward the master 801. The two-bit-sized start packet has been propagated to the first slave 802, and the terminal slave 805 is continuing to transmit the fourth and terminal slave header packet as indicated by "SLAVE 4 HEADER[3]" 835 in the SVTO REG descriptor field of the terminal slave 805. Four clock ticks later, at a fifth clock time 815 having a clock value of 10, the values of the packet bits have been further propagated toward the master 801. At the fifth clock time 815, the master 802 has already received the start packet, and is in the process of receiving bits of the terminal slave header packet as indicated by "SLAVE 4 HEADER[6]" 855 of the SVTI REG descriptor field of the master 801. Sixteen clock ticks later, at a sixth clock time 816 having a clock value of 26, a total of 16 bits, a length of a first "slave 4" telemetry data packet, has been transmitted onto the bus by the terminal slave 805 as indicated by "SLAVE 4 2ND TEL[15]" 837 of the SVTO REG descriptor field of the terminal slave 805. The value of X at the terminal slave 805 is a start value of the second telemetry packet. At this sixth clock time 816, the master 801 is in the middle of reading or receiving a first telemetry data packet from the terminal slave 805. Intervening slaves 802-804 are pipelining bits transmitted onto the bus by the terminal slave 805.

Sixteen clock ticks later, at a seventh clock time 817 having a clock value of 42, another 16 bits, the length of the second telemetry data packet, has been transmitted onto the bus by the terminal slave 805. As indicated by "SLAVE 3 HEADER[7]" 838, the terminal slave 805 is transmitting a start bit of a next slave's header packet. At this time, the terminal slave 805 has completed sending its two data packets that have been queued for submission to the master 801. The intervening slaves 802-804 continue to pipeline bits from its corresponding upstream slave.

Eight clock ticks later, at an eighth clock time 818 corresponding to a clock value of 50, the terminal slave 805 has completed sending the third slave header packet to the third slave 804. The terminal slave 805 has entered into an idle transmit state, indicated by "IDLE (1b)" 839, in which the terminal slave 805 transmits a value of 1 until receiving a further command on its SVC/SVD bus 126. The intervening slaves 802-804 continue to pipeline received bits and to transmit its own data packet bits upon receiving its header packet as part of a current data stream (in progress) to the master 801. The terminal slave 805 is capable of receiving a command in the idle transmit mode. For example, the terminal slave 805 could receive an acknowledgement command and could send out-of-order an acknowledgement response in the form of an acknowledgement packet. According to at least some embodiments, the terminal slave 805 remains in the idle transmit mode until the master 801 receives a slave 0 packet or the terminal slave 805 receives an acknowledgement command as described in relation to other figures. At the eighth clock time 818, the third slave 804 has received a last bit of its 8-bit third slave header packet by receiving a value of 1 at its SVTI 853 and as indicated by "SLAVE 3 HEADER[0]" in its SVTI REG descriptor field. The third slave 804 recognizes its third slave header packet and next begins to transmit its telemetry data packets, if any, to the second slave 803. If the third slave 804 has no telemetry data packets to send to the master 801, the third slave 804 sends a second slave header packet to the second slave 803 contiguously into the data stream after pipelining its third slave header packet.

In FIG. 9, at a ninth clock time 819 having a clock value of 84, after receiving its third slave header packet, the third slave 804 has already transmitted onto the bus its two telemetry data packets, as indicated by an end of a second telemetry data packet "SLAVE 3 2ND TEL[1]" and "SLAVE 3 2ND TEL[0]" in the SVTO and the SVTI descriptor fields, respectively, of the second slave 803. The third slave 804 is currently transmitting a first bit of a second slave header packet, the bit having a value of 1 as shown in its SVTO, the second slave header packet indicated by "SLAVE 2 HEADER[7]" in the SVTO REG descriptor field. Subsequent to the clock time 819 of the first row, the third slave 804 continues to transmit the second slave header packet. At a tenth clock time 820 having a clock value of 126, the second slave 803 has already transmitted onto the bus its two telemetry data packets, as indicated by an end of a second telemetry data packet "SLAVE 2 2ND TEL[1]" and "SLAVE 2 2ND TEL[0]" in the SVTO and the SVTI descriptor fields, respectively, of the first slave 802. The values at the end of the second telemetry data packet from the second slave 803 are X,X in the SVTO and the SVTI of the first slave 802. The first slave 802 continues to pipeline bits.

At an eleventh clock time 821 having a clock value of 152, the first slave 802 has already transmitted onto the bus one of its two telemetry data packets, as indicated by an end of a first telemetry data packet "SLAVE 1 1ST TEL[0]" in the SVTI descriptor field of the master 801. The fourth slave 805 continues to transmit a value of 1 and the intervening slaves 803, 804 continue to pipeline this value to the first slave 802. The first slave 802 is transmitting to the master 801 a first bit of value X of its second telemetry data packet as indicated by "SLAVE 1 2ND TEL[15]" in the SVTO REG descriptor field of the first slave 802.

At a twelfth clock time 822 having a clock value of 168, the first slave 802 has already transmitted to the master 801 both of its two telemetry data packets, as indicated by an end of a second telemetry data packet "SLAVE 1 2ND TEL[0]" in the SVTI descriptor field of the master 801. The first slave 802 is transmitting to the master 801 a first bit of value 1 of a slave 0 header packet as indicated by "SLAVE 0 HEADER [7]" in the SVTO REG descriptor field of the first slave 802. At a thirteenth clock time 823 having a clock value of 176, the first slave 802 has already transmitted to the master 801 a last bit of the slave 0 header packet to the master 801. The master 801, upon receiving the last bit, recognizes the slave 0 header packet and recognizes that this packet signals an end of the current data stream from the slaves 802-805. At the twelfth clock time 822, each of the slaves 802-805 has returned to the idle transmit mode as evident by the value of 1 in the SVTIs and SVTOs of the slaves 802-805. At a fourteenth clock time 824 having a clock value of 177, the master 801 is receiving a value of 1 on its SVTI and will continue to receive a stream of 1s until a subsequent command is transmitted to one or more of the slaves 802-805. For example, the bus remains idle with the terminal slave 805 transmitting a value of 1 at each clock cycle, and all non-terminal slaves 802-804 pipelining the value of 1, until the master 801 sends another data request packet or an acknowledgement is required to be returned by one of the slaves 802-805.

FIG. 10 is a chart 1000 showing clock times and packets received by the master 801 in accordance with some embodiments. The master 801 and set of slaves 802-805 operate as a system. In this example, the four slaves 802-805 are sending data packets to the master 801. The chart 1000 illustrates packets 1002 received by the master 801 at certain clock times 1001 for an entire command stream during which data in the form of data packets arrive at the master 801. A last bit of each of various packets 1003-1016 is received at the master 801 at the indicated clock times 1001. For example, at a first clock time of value 8, a start packet has been received by the master 801. According to some embodiments, and in reference to at least FIG. 10, received refers to receiving a last bit of the particular packet. For a start packet of eight bits, indexed and received from index [7] to [0], receipt of the start packet is recognized upon the master 801 receiving bit[0]. At a second clock time of value 16, a first header packet 1004 from the fourth slave 805, illustrated as 4.H, has been received by the master 801. At a third clock time of value 32, a first telemetry data packet 1005 from the fourth slave 805, illustrated as 4.1, has been received by the master 801. At a fourth clock time of value 48, a second telemetry data packet 1006 from the fourth slave 805, illustrated as 4.2, has been received by the master 801.

At a fifth clock time of value 56, a second header packet 1007 from the fourth slave 805 and signaling data to be sent from the third slave 804, illustrated as 3.H, has been received by the master 801. At a sixth clock time of value 72, a first telemetry data packet 1008 from the third slave 804, illustrated as 3.1, has been received by the master 801. At a seventh clock time of value 88, a second telemetry data packet 1009 from the third slave 804, illustrated as 3.2, has been received by the master 801. At an eighth clock time of value 96, a third header packet 1010 from the third slave 804 and signaling data to be sent from the second slave 803, illustrated as 2.H, has been received by the master 801. At a ninth clock time of value 112, a first telemetry data packet 1011 from the second slave 803, illustrated as 2.1, has been received by the master 801. At a tenth clock time of value 128, a second telemetry data packet 1012 from the second slave 803, illustrated as 2.2, has been received by the master 801.

At an eleventh clock time of value 136, a fourth header packet 1013 from the second slave 803 and signaling data to be sent from the first slave 802, illustrated as 1.H, has been received by the master 801. At a twelfth clock time of value 152, a first telemetry data packet 1014 from the first slave 802, illustrated as 1.1, has been received by the master 801. At a thirteenth clock time of value 168, a second telemetry data packet 1015 from the first slave 802, illustrated as 1.2, has been received by the master 801. Finally, at a fourteenth clock time of value 176, a fifth header packet 1016, illustrated as 0.H, has been received by the master 801. The fifth header packet 1016 is generated by the first slave 802, and, when received by the master 801, communicates that no further data is inbound to the master 801. The fifth header packet 1016 is a slave zero header packet. In other embodiments, a same set of packets 1002 is employed with different clock times depending on which device 801-805 that serves as a frame of reference for receipt of the packets 1002.

In addition to sending telemetry data packets, each slave is required to return an acknowledgement in response to receiving a command, or back-to-back command streams, on the SVC/SVD bus 126. One purpose of the acknowledgement by way of an acknowledgement packet is to confirm to the master, such as the master 101 or the master 801, that a valid command is received without error by all commanded slaves 102-105, 802-805 and that all future commands will be executed. After sending a command, or back-to-back stream of commands, the master waits until the master receives an acknowledgement before sending another command or stream of commands. Acknowledgments in the form of acknowledge packets are placed on the in-bound daisy-chained SVT_I/SVT_O bus 127 terminating at the SVTI 113 and acknowledgment packets are given priority over other packets including data streaming packets when transmitted toward the master 101.

FIG. 11 is a block diagram of an acknowledgement packet 1100 according to some embodiments. Values of 0,0 in the first two bits 1101 at positions 3,2 communicate to master and slaves that the data packet is the acknowledgement packet 1100. Other values of these bits 1101 would indicate another type of packet. The second two bits 1102 at positions 1,0 encode a response code of the acknowledgement. Values of 0,1 in the second two bits 1102 encode a completed acknowledgement (ACK). According to some embodiments, a slave returns a completed ACK if all commands previously received were valid and executable by the reporting slave. According to other embodiments, a completed ACK is transmitted to the master when there is no communication error detected by the reporting slave. When the master receives a completed ACK packet from a slave, the master confirms that the particular acknowledgement slave properly executed its commands in a previous command stream. A previous command stream is a set of one or more commands transmitted to the slaves on the SVD 112 and does not include commands currently being executed and interrupted by receipt of the acknowledgement packet 1100.

Values of 1,0 in the second two bits 1102 of the acknowledgement packet 1100 encode an invalid command. A slave returns the invalid command in the acknowledgement packet 1100 if any command in the previous command stream was invalid or not executable and there was no detected communication error. An invalid command packet indicates to the master that at least one command from one of the reporting slaves was invalid or not executable during the previous command stream. The invalid command does not indicate a communication error. Values of 1,1 in the second two bits 1102 encode a communication error. A slave returns a communication error packet if there was any communication error detected during the previous command stream. The communication error packet indicates to the master that at least one of the reporting slaves encountered a communication error during the previous command stream.

Values of 0,0 in the second two bits 1102 encode an incomplete acknowledgement packet. The terminal slave returns on its SVT_O 123 an incomplete acknowledgement packet in response to the terminal slave not being an acknowledgement (ACK) slave. That is, the incomplete acknowledgement packet, having values of 0,0,0,0 for the four bits, is sent by the terminal slave 105 downstream toward the master when the terminal slave 105 is not the slave to report the acknowledgement bits and one or more of the downstream slaves 102-104 are to report their respective acknowledgements. The last two bits of each acknowledgement packet are modified by the designated reporting ACK slave or slaves on the daisy-chained bus before reaching the master when the slaves are communicating properly with each other and the master. If the master receives an unmodified acknowledgement packet, the incomplete acknowledgement packet indicates a general communication error to the master when the ACK slave receives and fails to update the incomplete acknowledgement packet designated for it. That is, when a master receives an unaltered incomplete acknowledgement packet, the master is on notice that an error occurred. In summary with respect to acknowledgement, there are four types of acknowledgment packets as indicated in the second two bits 1102 of the four-bit acknowledgement packet 1100 corresponding to the values of 0,0; 0,1; 1,0; and 1,1. According to some embodiments, the furthest designated slave to make an acknowledgement modifies the incomplete acknowledgement packet before sending the bits of the acknowledgement packet 1100 along the daisy-chained bus and eventually to the master. Acknowledgment packets are not limited to those described herein and those described herein are by way of example of how acknowledgement operations are performed according to certain embodiments.

Acknowledgement packets 1100 are sent out of order and are framed differently than telemetry data packets. According to certain embodiments, the acknowledgement packet 1100 does not require a two-bit sized start packet preceding it or following it when communicated on the daisy-chained bus. The four-bit packet having the first two bits of values 0,0 indicates to the master and slaves in the daisy-chained bus that an acknowledgement packet 1100 is incoming. For the acknowledgment packet structure, the end of an acknowledgement is indicated by counting a total of four bits. Acknowledgement operation is described in three parts hereinbelow: (1) terminal slave rules for the last slave in the daisy-chained bus, (2) non-terminal reporting slave rules for any slave presently transmitting data on the daisy-chained bus, and (3) rules for any slave that is required to communicate its status in the acknowledgment packet.

For the first part, the terminal slave 105 monitors the SVC/SVD bus 126 for completed commands and completed command streams addressed to one or more of the slaves. Following a stream of command packets or an individual command, the terminal slave 105 performs actions depending on whether the terminal slave 105 is reporting and whether the terminal slave requires an acknowledgment. For a first case, the terminal slave 105 is not reporting and does not require an acknowledgment. For the first case, the terminal slave 105 transmits an incomplete acknowledge packet having a payload of values of 0,0. For a second case, the terminal slave 105 is not reporting and requires an acknowledgment. For the second case, the terminal slave 105 transmits the appropriate one of the four acknowledgment packets to the next slave 104. For a third case, the terminal slave 105 is reporting and does not require an acknowledgment. For the third case, the terminal slave 105 finishes transmitting its current data packet and contiguously transmits an incomplete acknowledge packet 1100. The terminal slave 105 then resumes transmitting, contiguously to an end of the acknowledge packet 1100, its next scheduled packet. For a fourth case, the terminal slave 105 is reporting and requires an acknowledge. For the fourth case, the terminal slave 105 finishes transmitting its current packet, transmits the appropriate acknowledge packet 1100 contiguously at an end of its current packet, and resumes reporting its next scheduled packet contiguously at an end of the transmitted acknowledge packet 1100.

For the second part with respect to non-terminal reporting slaves, acknowledgement packet operations function as follows according to some embodiments. When a non-terminal slave 102-104 that is transmitting packets detects an incoming acknowledgement packet on its SVT_I input 125, and while transmitting on its SVT_O 123, performs certain actions including the following. The non-terminal slave 102-104 begins queuing acknowledge packet bits into a separate four-bit first-in, first-out (FIFO) buffer and finishes transmitting its present data packet. Next, the non-terminal slave 102-104 begins de-queuing and transmitting the buffered acknowledge packet until the four-bit FIFO buffer is empty, and then continues transmitting, contiguously to the transmitted acknowledge packet, its next data packet. An acknowledge slave 102-104 pipelines any incoming acknowledge packets and modifies outgoing acknowledge packet bits based on Table 1 as follows.

| INPUT | | | | OUTPUT | |
|---|---|---|---|---|---|
| ACK TYPE REPORTED BY SLAVE | | PIPELINE IN SVTI | | PIPELINING OUT SVTO | |
| BIT[1] | BIT[0] | BIT[1] | BIT[0] | BIT[1] | BIT[0] |
| 0 | 1 | 0 | X | 0 | 1 |
| 0 | 1 | 1 | 0 | 1 | 0 |
| 1 | 0 | 0 | X | 1 | 0 |
| 1 | 1 | X | X | 1 | 1 |
| X | X | 1 | 1 | 1 | 1 |

Table 1 is one example of a truth type table and scheme used for acknowledgements. According to some embodiments of the scheme, buffered ACK bits are only modified if a particular slave is reporting telemetry and has an acknowledgement to report. If a slave is not reporting the acknowledgement, the slave does not modify buffered or enqueued acknowledgement bits. A slave that is not reporting telemetry data packets does not need to buffer the ACK bits and modifies received ACK bits if the particular has an acknowledgement to report.

In Table 1, the input bits are the last two bits 1102 of the four-bit acknowledgement packet 1100. The input bits are broken into two categories: a first category of "ACK Type Reported by Slave" for the type of acknowledgement to be reported by the acknowledgement slave, and a second category of "Pipelining In SVTI" for the data that is being received on the SVTI. The output indicates the acknowledgement type that will be reported on the SVTO by the acknowledgement slave. For example, if the terminal slave 105 is the acknowledgement slave, the terminal slave 105 sends an acknowledgement type data packet with values of 0,0,0,1. One purpose of Table 1 is to communicate a priority. Use of Table 1 enables and maintains the following priority:
1. NACK, Communication Error (a highest priority)
2. NACK, Invalid Command
3. Completed ACK
4. Incomplete ACK (lowest priority)

In some embodiments, multiple slaves send different ACKs back to back and send multiple and different ACKs at different times before, during, and after each communication stream. Use of Table 1 maintains a priority when different ACKs are transmitted by different slaves. A NACK takes priority over a Completed ACK.

FIGS. 12 and 13 together illustrate a chart 1200 showing telemetry input and output values for a master 1201 and a set of daisy-chained slaves 1202-1205 in accordance with some embodiments at several clock times illustrating acknowledgement packet operations. The chart 1200 illustrates how the chart 800 would be impacted with an acknowledgement sent by the second slave 1203. Across a top of the chart 1200 are represented the master 1201 that is receiving packets, bit by bit, from the slaves 1202-1205 on its SVTI 1253 as indicated by an SVTI value 1 252. An SVTI descriptor field 1251, indicated as "SVTI REG" and having value "SLAVE 1 1ST TEL[0]" corresponds to and describes the SVTI value 1 252. An SVTO descriptor 1231, indicated as "SVTO REG" at a terminal slave 1205 corresponds to and describes the SVTO value 1 232. A value of the SVTO REG descriptor field for the terminal slave 1205 is "IDLE (1b)." An "X" in the SVTI value 1 252 or the SVTO value 1 232 of any device indicates that the value is one of value 0 or value 1 at the particular clock time. While the master 1201 only has an SVTI 1253, each of the slaves 1202-1205 includes both an SVTI 1253 and an SVTO 1254.

The chart 1200 includes values at various clock times 1211-1218, one clock time per row, as indicated in the first (left) column. The chart 1200 illustrates a data request and data transmission already in progress. The chart 1200 at a first clock time 1 211 of the first row is at a clock value of 152 which is a same clock time as at the eleventh clock time 821 of FIG. 9. In this example, the second slave 1203 is required to provide an acknowledgement (ACK) by way of updating an ACK packet received from the terminal slave 1205. In FIG. 12, the ACK packet is handled out-of-order in the data stream. At the first clock time 1 211, the first slave 1202 is transmitting a first bit of its second telemetry data packet as indicated by "SLAVE 1 2ND TEL[15]" at its SVTO REG descriptor field. For purposes of nomenclature, the second slave 1203 is a current slave or reporting device, the first slave 1202 is a downstream slave or downstream reporting device, and the third slave 1204 is an upstream slave or upstream reporting device. The value of the first bit at the second slave 1202 is X. The slaves 1203-1205 upstream from the first slave 1202 are in the idle transmit state as evidenced by the respective SVTIs 1253 and SVTOs 1254 registering the value 1. Sometime before the first clock time of the first row 1211, the second slave 1203 is signaled to provide an ACK by means of a completed command or command stream, and the terminal slave 1205 is signaled to transmit an incomplete acknowledge packet onto the bus toward the second slave 1203.

At a second clock time 1 212 having a clock value of 153, the terminal slave 1205 begins transmitting an acknowledge packet having a four-bit packet size as in FIG. 11. A first bit of value 0 and as indicated by "ACK[3]" 1233 in the SVTO REG descriptor field is transmitted by the terminal slave 1205 at its SVTO 1234. One clock tick later, at a third clock time 1 213, the first bit of the acknowledge packet, having value of 0 at position 3, has been propagated to the third slave 1204, and the fourth and terminal slave 1205 has the second bit of value 0 as indicated by "ACK[2]" in the SVTO REG descriptor field.

Four clock ticks later, at a fourth clock time 1 214 having a clock value of 158, the values of the packet bits have been propagated toward the master 1201. The four-bit sized acknowledge packet, having values of 0,0,0,0 at positions 3,2,1,0 (respectively), has been propagated to the first three slaves 1202-1204, and the terminal slave 1205 has returned to the idle transmit state. The first bit ACK[3] of the acknowledge packet has reached the SVTI 1253 of the first slave 1202 as the second slave 1203 has pipelined the value of 0 of the ACK[3] to the first slave 1202. At the fourth clock time 1 214, the first slave 1202 continues to transmit bits of its second telemetry data packet as indicated by "SLAVE 1 2ND TEL[9]" in its SVTO REG descriptor field. The value of this tenth bit is "X" in the SVTO 1254 of the first slave 1202.

One clock tick later, at a fifth clock time 1 215 having a clock value of 159, the values of the packet bits have been further propagated toward the master 1201. The four-bit sized acknowledge packet, having values of 0,0,0,0 at positions 3,2,1,0 (respectively), has been completely propagated to the second slave 1203 as indicated by the ACK[0] of the acknowledge packet in the SVTI REG descriptor field of the second slave 1203. The first slave 1202 continues to transmit bits of its second telemetry data packet as indicated by "SLAVE 1 2ND TEL[8]" in its SVTO REG descriptor field. Further, with respect to the acknowledge packet, the first slave 1202 has begun to buffer the acknowledge packet as indicated by the "ACK [2]" in the SVTI REG descriptor field of the first slave 1202 and indicated by an absence of the first bit "ACK[3]" in the chart 1200. The value of ACK[0], the last bit of the acknowledge packet, is 0 at the fifth clock time 1 216.

One clock tick later, at a sixth clock time 1 216 having a clock value of 160, the value of ACK[0] has been changed to 1 as indicated at the SVTO 1254 of the second slave 1203. A value of 1 indicates no error and proper operation of the second slave 1203 during a most recent-in-time previous data stream. Two of the bits of the acknowledge packet, ACK[3] and ACK[2], have been buffered by the first slave 1202 as indicated by "ACK[1]" in the SVTI REG descriptor field of the first slave 1202. The four-bit sized acknowledge packet has been propagated to the second slave 1204 as indicated by the ACK[0] of the acknowledge packet in the SVTO REG descriptor field of the second slave 1203 and the last bit ACK[0] is being transmitted to the first slave 1202. The first slave 1202 continues to transmit bits of its second telemetry data packet as indicated by "SLAVE 1 2ND TEL[7]" in its SVTO REG descriptor field. The first slave 1202 continues to buffer the acknowledge packet as indicated by the "ACK [1]" in the SVTI REG descriptor field of the first slave 1202 and indicated by an absence of the first bit "ACK[3]" and the second bit "ACK[2]" in the chart 1200.

One clock tick later, at a seventh clock time 1 217 having a clock value of 161, the last bit of the acknowledgement packet, ACK[0], has been transmitted to the SVTI 1253 of the first slave 1202. Three of the bits of the acknowledge packet, ACK[3:1], have been buffered by the first slave 1202 as indicated by "ACK[0]" in the SVTI REG descriptor field of the first slave 1202. The four-bit sized acknowledge packet has been propagated to the first slave 1202 as indicated by the ACK[0] of the acknowledge packet in the SVTI REG descriptor field of the first slave 1202. The first slave 1202 continues to transmit bits of its second telemetry data packet as indicated by "SLAVE 1 2ND TEL[6]" in its SVTO REG descriptor field. The first slave 1202 continues to buffer the acknowledge packet as indicated by the "ACK [0]" in the SVTI REG descriptor field of the first slave 1202 and indicated by an absence of the first three bits "ACK[3]," "ACK[2]," and "ACK[1]" in the chart 1200.

Six clock ticks later, at an eighth and final clock time 1 218 of FIG. 12 at a clock value of 167, the last bit of the acknowledgement packet, the entire acknowledge packet has been buffered by the first slave 1202 into its ACK buffer and the first slave 1202 is transmitting a last bit of its second and last data packet to the master 1201 as indicated by "SLAVE 1 2ND TEL[0]" in the SVTO REG descriptor field of the first slave 1202.

At a ninth clock time 1 219 of FIG. 13 having a clock value of 168, the master 1201 has received a last bit of value X as indicated by "SLAVE 1 2ND TEL[0]" in the SVTI REG descriptor field, and the first slave 1202 is transmitting a first bit of value 0 of the four-bit acknowledge packet as indicated by "ACK[3]" IN THE SVTO REG descriptor field of the first slave. At the next three clock times 1220, 1221, and 1222, the master 1201 continues to receive the remainder of the bits of the acknowledge packet that is cached in the first slave 1202. The second, third, and fourth slaves 1203-1205 continue to pipeline the value 1 in their SVTOs 1254 and SVTIs 1253 as these slaves 1203-1205 continue to be in the idle transmit mode. Prior to the ninth clock time 1 219, the first slave 1202 was arranged to finish transmitting its current packet "SLAVE 1 2ND TEL[XX]" to the master 1201 before submitting out-of-order the four-bit acknowledge packet.

At a thirteenth time 1 223 having a clock value of 172, the master 1201 receives the last bit ACK[0] of the acknowledgement packet as indicated in its SVTI REG descriptor field 1255. The last bit ACK[0] has a value of 1. At the thirteenth time 1 223, the master 1201 recognizes that the second slave 1203 issued a valid ACK packet and indicates no error and proper operation of the second slave 1203 during the previous command stream. Also at the thirteenth time 1 223, the first slave 1202 returns to normal transmission behavior by transmitting a first bit of a slave zero header packet as indicated by "SLAVE 0 HEADER[7]" in the SVTO REG descriptor field having a value of 1 in the SVTI of the first slave 1202. At a fourteenth and last time 1 224 having a clock value of 173, the first slave 1202 continues to transmit bits of the slave zero header packet as indicated by "SLAVE 0 HEADER[6]" in the SVTO REG descriptor field. A few clock cycles after clock value 1 73, the master 1201 will have received all of the bits of the slave zero header packet. The slave zero header packet happens to be the end of a command stream for the system having the master 1201 receiving data from all of the slaves 1202-1205. As this example shows, a four-bit acknowledgement packet has been inserted between packets and inserted out-of-order during a continuous reporting of data packets as previously described in relation to FIGS. 8-10.

FIG. 14 is a chart 1400 showing clock times and packets received by the master 1201 in accordance with some embodiments as the master 1201 operates with slaves 1202-1205 as illustrated in FIG. 12 and FIG. 13. The chart 1400 illustrates packets 1402 received by the master 1201 at certain clock times 1401 for an entire command stream including an acknowledgement packet sent to the master 1201 as represented by "ACK" at clock time having a value of 172. The chart 1400 is otherwise similar to chart 1000. A last bit of each of various packets 1403-1417 is received at the master 1201 at the indicated clock times 1401. For example, at a first clock time of value 8, all of the bits of a start packet have been received by the master 1201. According to some embodiments, and in reference to at least FIG. 14, "received" refers to receiving a last bit of the particular packet. For a start packet of eight bits, indexed and received from index [7] to [0], receipt of the start packet is recognized upon the master 1201 receiving bit[0].

At a second clock time of value 16, a first header packet 1404 from the fourth slave 1205, illustrated as 4.H, has been received by the master 1201. At a third clock time of value 32, a first telemetry data packet 1405 from the fourth slave 1205, illustrated as 4.1, has been received by the master 1201. At a fourth clock time of value 48, a second telemetry data packet 1406 from the fourth slave 805, illustrated as 4.2, has been received by the master 1201. At a fifth clock time of value 56, a second header packet 1407 from the fourth slave 1205 and signaling data to be sent from the third slave 1204, illustrated as 3.H, has been received by the master 1201. At a sixth clock time of value 72, a first telemetry data packet 1408 from the third slave 1204, illustrated as 3.1, has been received by the master 1201. At a seventh clock time of value 88, a second telemetry data packet 1409 from the third slave 1204, illustrated as 3.2, has been received by the master 1201. At an eighth clock time of value 96, a third header packet 1410 from the third slave 1204 and signaling data to be sent from the second slave 1203, illustrated as 2.H, has been received by the master 1201. At a ninth clock time of value 112, a first telemetry data packet 1411 from the second slave 1203, illustrated as 2.1, has been received by the master 1201. At a tenth clock time of value 128, a second telemetry data packet 1412 from the second slave 1203, illustrated as 2.2, has been received by the master 801. At an eleventh clock time of value 136, a fourth header packet 1413 from the second slave 1203 and signaling data to be sent from the first slave 1202, illustrated as 2.H, has been received by the master 1201. At a twelfth clock time of value 152, a first telemetry data packet 1414 from the first slave 1202, illustrated as 1.1, has been received by the master 1201. At a thirteenth clock time of value 168, a second telemetry data packet 1415 from the first slave 1202, illustrated as 1.2, has been received by the master 1201.

At a fourteenth clock time of value 172, an acknowledgment packet 1416, illustrated as ACK, has been received by the master 1201 according to ACK packet out-of-order delivery as illustrated in FIG. 12 and FIG. 13. The ACK packet communicates a status of one or more of the slaves 1202-1205 in the system of devices. Finally, at a fifteenth clock time of value 180, a fifth header packet 1417, illustrated as 0.H, has been received by the master 1201. The fifth header packet 1417 is generated by the first slave 1202 and when received by the master 1201, communicates that no further data is inbound to the master 1201.

Figure 15:
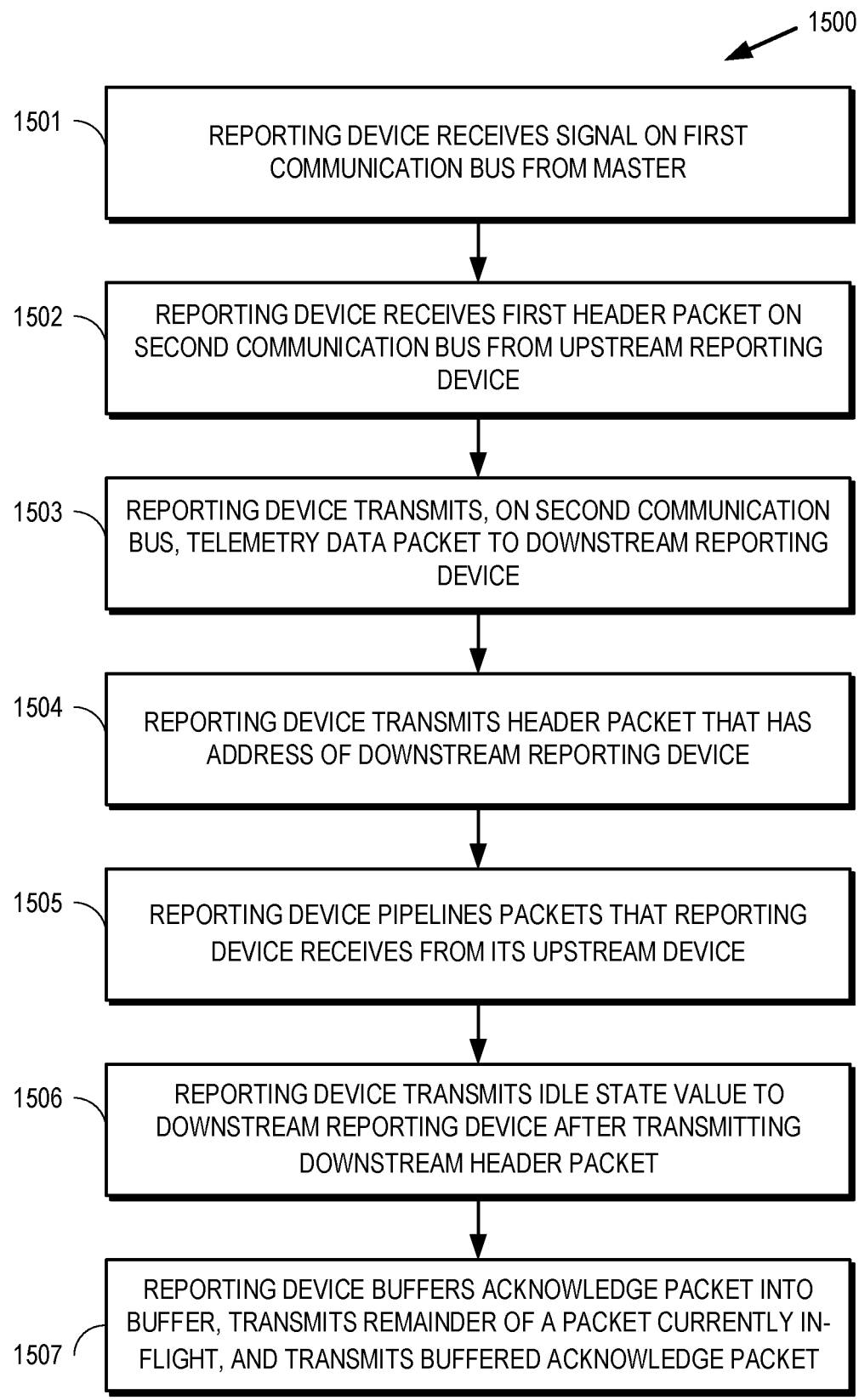
FIG. 15 is a flow diagram illustrating a method for a reporting device to communication with a master of the system of FIG. 1 in accordance with some embodiments.

FIG. 15 is a flow diagram illustrating a method 1500 for a reporting device to communication with a master device in accordance with some embodiments. For ease of reference, the method 1500 is described in the example context of the system 100 of FIG. 1. At block 1501, a reporting device (e.g., one of slaves 102-104) of a plurality of reporting devices receives a signal on a first component (e.g., SVD 122 of FIG. 1) from a master device (e.g., master 101). The received signal triggers the reporting device to prepare to transmit a telemetry data packet to a downstream reporting device of the plurality of reporting devices. At block 1502, the reporting device receives a first header packet on a second component (e.g., SVT_I 123 of FIG. 1) from an upstream reporting device (e.g., terminal slave 105). According to certain embodiments, the first header packet (e.g., header packet 400) includes a first address of the reporting device. At block 1503, the reporting device transmits, on the second component, the telemetry data packet to the downstream reporting device. At block 1504, the reporting device transmits a second header packet that includes a second address of the downstream reporting device. Receipt by the downstream reporting device triggers the downstream reporting device to add its telemetry data packet or packets to its downstream slave or reporting device or to the master device, depending on the particular slave and its position in the system of networked devices.

At block 1505, the reporting device pipelines data packets and other bits that the reporting device receives from its upstream device. For example, the reporting device pipelines to the downstream reporting device at least one of a header packet having an address of the upstream reporting device, and a telemetry data packet having data from the upstream reporting device. At block 1506, the reporting device transmits an idle state value to the downstream reporting device after transmitting a downstream header packet that has an address of the downstream reporting device. The reporting device does so until receiving a next header packet having the first address of the reporting device, or until receiving an acknowledge packet to report to the master device. At block 1507, the reporting device is capable of receiving an acknowledge packet. When the reporting device does so, the reporting device buffers the acknowledge packet into a device acknowledge buffer, transmits a remainder of a packet currently in-flight to the downstream reporting device, and then transmits the buffered acknowledge packet after transmitting the current or currently in-flight packet. The reporting device performs the actions at block 1507 in response to receiving an acknowledge signal from the master device, the acknowledge signal causing the reporting device to provide its acknowledge status. Before transmitting the buffered acknowledge packet, the reporting device may update a bit of the buffered acknowledge packet based on the status of the reporting device. According to at least some embodiments, when a slave or reporting device transmits bits of packets, the reporting device transmits the bits contiguously with respect to one another. That is, the packets are transmitted or pipelined contiguously with respect to one another.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD)), magnetic media (e.g., magnetic tape, magnetic hard drive), volatile memory (e.g., random access memory (RAM) or cache), non-volatile memory (e.g., read-only memory (ROM) or flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A reporting device comprising:
   a first component directly coupling the reporting device to a master device, the first component configured to receive a telemetry request and an acknowledge signal from the master device, the acknowledge signal requesting an acknowledge status of the reporting device; and
   a second component synchronously coupling the reporting device to the master device via one or more other reporting devices configured in a daisy-chained arrangement, the second component configured to:
      receive a first header packet including an address of the reporting device;
      in response to the telemetry request from the master device and in response to receiving the first header packet, transmit a telemetry data packet to a downstream reporting device of the one or more other reporting devices; and
      transmit a second header packet including an address of the downstream reporting device.

2. The reporting device of claim 1, wherein the second component is further configured to:
   after transmitting the second header packet, enter an idle transmit mode;
   exit the idle transmit mode in response to receiving a next header packet including the address of the reporting device; and
   exit the idle transmit mode in response to receiving an acknowledge packet to report to the master device.

3. The reporting device of claim 1, further comprising:
   a third component configured to:
      derive a timing signal from a clock signal from the master device; and
      transmit packets to the downstream reporting device based on the timing signal.

4. The reporting device of claim 1, further comprising:
   a third component coupled to an upstream reporting device in the daisy-chained arrangement, the reporting device further configured to:
      receive, by the third component, an acknowledge packet;
      while transmitting a current packet to the downstream reporting device, buffer at least a portion of the acknowledge packet into a device ACK buffer; and
      before sending a next packet after the current packet, transmit, to the downstream reporting device, the buffered acknowledge packet.

5. The reporting device of claim 4, the reporting device further configured to:
   before transmitting the buffered acknowledge packet, update the buffered acknowledge packet based on the acknowledge status of the reporting device.

6. The reporting device of claim 1, wherein the reporting device is coupled to a reset line, and the reporting device further is configured to:
   receive an active signal on the reset line; and
   in response to receiving the active signal, set registers of the reporting device to a default state.

7. The reporting device of claim 1, wherein at least one of:
   the reporting device is configured to transmit the first header packet contiguous to the telemetry data packet to the downstream reporting device; and
   the reporting device is configured to transmit the telemetry data packet contiguous to the second header packet to the downstream reporting device.

8. A method comprising:
   receiving, by a first reporting device of a plurality of reporting devices that are connected by a daisy-chained network, a telemetry request and an acknowledge signal from a master device on a first bus that directly couples the first reporting device to the master device, the acknowledge signal requesting an acknowledge status of the first reporting device;
   receiving, by the first reporting device from an upstream reporting device in the daisy-chained network, a first header packet on a second bus, the first header packet including an address of the first reporting device;
   in response to the telemetry request and to the first header packet, transmitting, by the first reporting device, on the second bus, a telemetry data packet to a downstream reporting device; and
   transmitting, by the first reporting device, a second header packet including an address of the downstream reporting device.

9. The method of claim 8, further comprising:
   prior to the first reporting device transmitting the telemetry data packet on the second bus to the downstream reporting device, the first reporting device pipelining to the downstream reporting device at least one of:
      a third header packet including an address of the upstream reporting device; and
      a second telemetry data packet including data from the upstream reporting device.

10. The method of claim 8, further comprising:
    after transmitting the second header packet, entering by the first reporting device, an idle transmit mode; and
    exiting the idle transmit mode in response to receiving, by the first reporting device, a next header packet including the address of the first reporting device.

11. The method of claim 8, further comprising:
    deriving, by the first reporting device, timing information from a clock signal from the master device; and
    synchronously transmitting, by the first reporting device, at least one of the first header packet, the telemetry data packet, and the second header packet to the downstream reporting device based on the timing information.

12. The method of claim 8, further comprising:
    receiving, by the first reporting device, an acknowledge packet;

buffering, by the first reporting device, the acknowledge packet into a device ACK buffer of the first reporting device;

completing transmission of a current packet, by the first reporting device, to the downstream reporting device; and transmitting, by the first reporting device, the buffered acknowledge packet after transmitting the current packet.

13. The method of claim 12, further comprising:

before transmitting, by the first reporting device, the buffered acknowledge packet, updating, by the first reporting device, a bit of the buffered acknowledge packet based on the acknowledge status of the first reporting device, wherein the telemetry request from the master device is received subsequent to receiving the acknowledge packet.

14. The method of claim 8, wherein the first reporting device is coupled to a reset line, and the method further comprises:

receiving, by the first reporting device, an active signal on the reset line; and in response to receiving the active signal, setting, by the first reporting device, registers of the first reporting device to a default state.

15. The method of claim 8, further comprising at least one of:

transmitting the first header packet contiguous to the telemetry data packet to the downstream reporting device; and transmitting the telemetry data packet contiguous to the second header packet to the downstream reporting device.

16. The method of claim 8, further comprising:

continuously receiving, by the first reporting device, a reference voltage as a reference for communication on the first bus and on the second bus.

17. A system comprising:

a plurality of reporting devices;

a master device coupled to each of the plurality of reporting devices by a first component and serially coupled in a daisy-chained configuration to the plurality of reporting devices by a second component, and the master device is configured to:

signal each of the plurality of reporting devices to transmit a telemetry data packet to the master device, wherein, in response to the signal to transmit the telemetry data packet, each of the reporting devices is configured to:

add respective telemetry data to a telemetry data packet;

transmit the telemetry data packet to a next respective downstream device in the daisy-chained configuration, wherein downstream devices in the daisy-chained configuration comprise the plurality of reporting devices and the master device; and transmit a header packet to the next respective downstream device, the header packet including an address of the next respective downstream device; and a terminal reporting device of the plurality of reporting devices, the terminal reporting device is configured to:

transmit a start packet to a next reporting device of the plurality of reporting devices that is directly coupled downstream from the terminal reporting device; and transmit a first header data packet including an address of the terminal reporting device to the next reporting device; and a closest reporting device of the plurality of reporting devices directly coupled to the master device by the second component, the closest reporting device is configured to:

subsequent to transmitting the telemetry data packet of the closest reporting device to the master device, transmit a slave-zero packet to the master device, wherein the slave-zero packet indicates an end to a data transmission including the telemetry data packet of the closest reporting device.

18. The system of claim 17, each reporting device downstream from the terminal reporting device is further configured to:

send, to the next respective downstream device, at least one of:

a header packet received from a respective upstream reporting device; and a telemetry data packet received from the respective upstream reporting device.

19. The system of claim 17, the terminal reporting device is further configured to:

in response to transmitting downstream a last packet, enter an idle transmit mode;

exit the idle transmit mode in response to receiving, by the terminal reporting device, a second signal to transmit a second telemetry data packet to the master device; and exit the idle transmit mode in response to receiving, by the terminal reporting device, an acknowledge signal from the master device to transmit a complete or an incomplete acknowledge packet downstream to the next reporting device.

20. The system of claim 17, each reporting device downstream from the terminal reporting device is further configured to:

receive an acknowledge packet from a respective upstream reporting device;

buffer the acknowledge packet into a device ACK buffer;

complete transmission of a current packet to the next respective downstream reporting device; and transmit the buffered acknowledge packet after completing transmission of the current packet.

21. The system of claim 20, each reporting device downstream from the terminal reporting device is further configured to:

receive an acknowledge signal from the master device that requests an acknowledge status; and before transmitting the buffered acknowledge packet, update the buffered acknowledge packet based on a respective acknowledge status.

22. The system of claim 17, wherein each reporting device of the plurality of reporting devices is coupled to a reset line, and each reporting device is further configured to:

receive an active signal on the reset line; and in response to receiving the active signal, set corresponding registers to a default state.

* * * * *